Nov. 11, 1952  L. R. COX  2,617,525
METALS RECOVERY UNIT
Filed April 3, 1950  2 SHEETS—SHEET 1

INVENTOR
Lee R. Cox
BY
ATTORNEYS

Nov. 11, 1952 — L. R. COX — 2,617,525
METALS RECOVERY UNIT
Filed April 3, 1950 — 2 SHEETS—SHEET 2

INVENTOR
Lee R. Cox
BY
ATTORNEYS

Patented Nov. 11, 1952

2,617,525

UNITED STATES PATENT OFFICE 2,617,525

METALS RECOVERY UNIT

Lee R. Cox, Sacramento, Calif., assignor to Modoc Laboratories, Inc., Alturas, Calif., a corporation of California Application April 3, 1950, Serial No. 153,717

4 Claims. (Cl. 209—57)

This invention is directed to, and it is an object to provide, a metals recovery unit of novel design and function; such unit being especially adapted, but not limited, for use to recover fine or flour gold.

Another object of the invention is to provide a metals recovery unit which employs the mercury amalgamation process in a unique manner; to-wit, previously classified gangue, with the included metal such as gold, is passed in a water stream downwardly through a plurality of horizontally disposed copper wool sponges or pads, the latter being mercurized to effectively amalgamate the gold from said gangue.

An additional object of the invention is to provide a metals recovery unit, as in the preceding paragraph, wherein the copper wool pads are removably supported in drawers, of novel design, mounted in the housing of the unit for ready withdrawal; this being a marked advantage permitting the device to operate continuously, as the drawers may be readily and quickly manually withdrawn and replaced without shutting down the operation of the unit.

A further object of the invention is to provide a metals recovery unit, which has a relatively high capacity, yet is efficient in the recovery of gold from the gangue; its efficiency being sufficiently high that normally discarded tailings can be reworked profitably. However, the unit is well adapted for use in initial processing of metal bearing materials, as well as reworking tailings as above.

It is also an object of the invention to provide a metals recovery unit which is designed for ease and economy of manufacture; the unit being of simple yet sturdy construction.

Still another object of the invention is to provide a practical and reliable metals recovery unit, and one which will be exceedingly effective for the purpose for which it is designed.

These objects are accomplished by means of such structure and relative arrangement of parts as will fully appear by a perusal of the following specification and claims.

Figure 1:
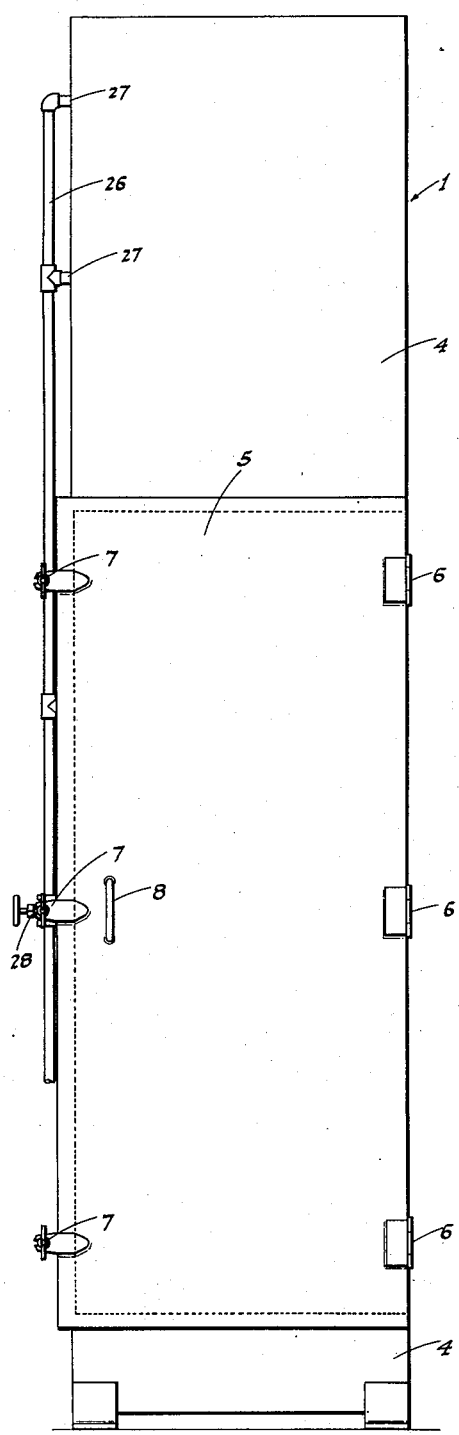
Fig. 1 is a front elevation of the novel metals recovery unit.
Figure 2:
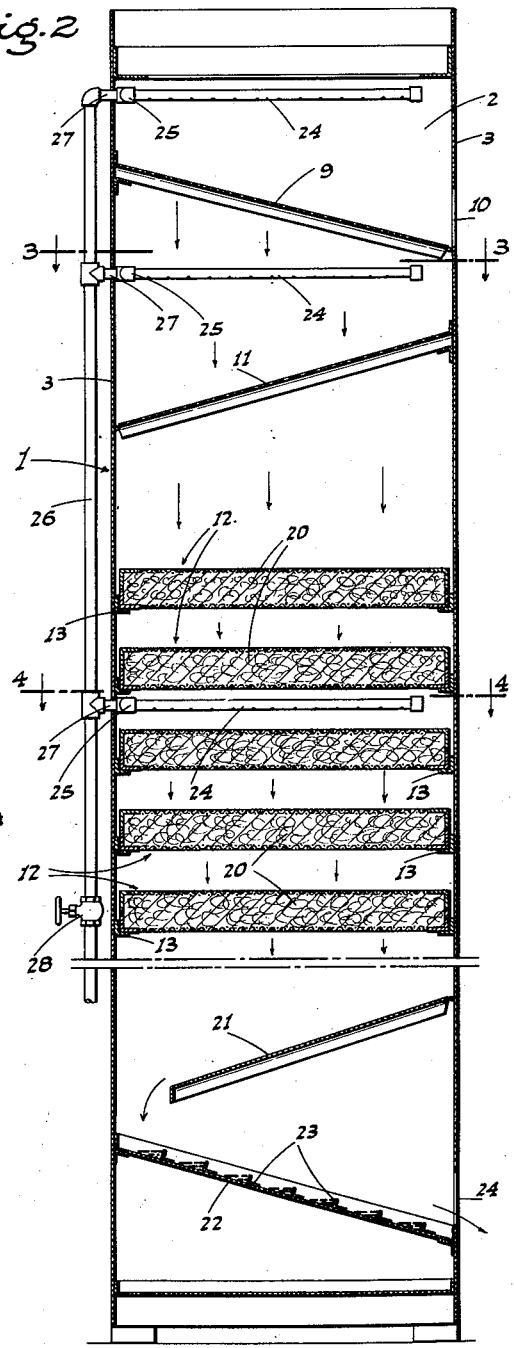
Fig. 2 is a sectional elevation of the same.
Figure 3:
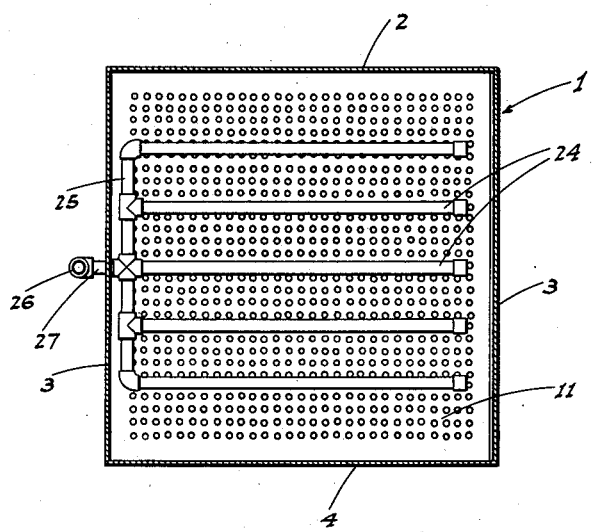
Fig. 3 is a sectional plan view on line 3—3 of Fig. 2.
Figure 4:
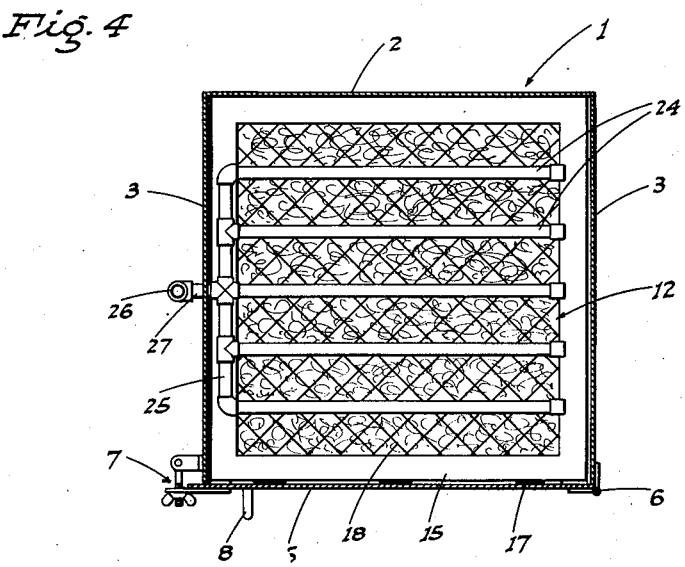
Fig. 4 is a sectional plan view on line 4—4 of Fig. 2.
Figure 5:
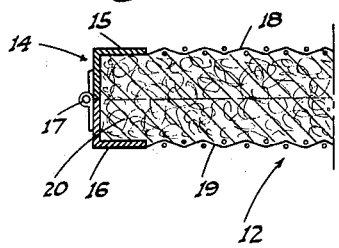
Fig. 5 is a fragmentary transverse section of one of the copper wool pad supporting drawers.

Referring now more particularly to the characters of reference on the drawings, the novel metals recovery unit comprises a vertically elongated housing, indicated generally at 1, which housing is preferably rectangular in plan.

The housing 1 includes a back wall 2, side walls 3, and a front wall 4; at least the lower half of the latter being in the form of a door 5 hinged along one vertical side edge, as at 6, for opening from a normally closed position.

The door 5 is normally held closed by releasable securing devices 7, and said door is fitted, on the front, with a readily accessible handle 8.

At the top thereof the housing 1 is open so that material to be processed may be fed downwardly into said housing.

A perforate classifier plate 9 is fixed in, and extends in full matching relation across, the housing 1 adjacent but short of its upper end; said classifier plate being at a downward incline from side to side of the housing; the latter having a discharge opening 10 in the side thereof at the lower end of said classifier plate.

A perforate distributor plate 11 is fixed in the housing 1 in adjacent but spaced relation below the classifier plate 9; said distributor plate 11 extending in matching relation across the housing from side to side thereof and at a downward incline opposed to the incline of the classifier plate 9.

Below the distributor plate 11 the housing 1 is fitted with a plurality of vertically spaced drawers, each indicated generally at 12; said drawers all being supported for withdrawal from the housing 1, when the door 5 is open, by means of flanges 13 on opposite sides of said housing internally thereof.

By opening the door 5 the drawers 12 may be selectively and separately withdrawn from the housing 1.

As all of the drawers 12 are of identical construction a description of one will suffice.

Each drawer 12 comprises a rectangular border frame 14 of inwardly facing channel shape; such border frame being split horizontally and centrally into an upper portion 15 and a lower portion 16. The upper and lower portions 15 and 16 of the border frame 14 are hinged together along one edge, as at 17.

The rectangular border frame 14 is fitted with a top screen 18 and a bottom screen 19 secured, respectively, to the upper portion 15 and lower portion 16. Between the top screen 18 and bottom screen 19 each drawer carries a relatively thick full-size pad 20 of copper sponge or wool;

such copper wool being mercurized. The mercurization of the copper wool pads 20 is accomplished, in advance of use in the instant metals recovery unit, by any suitable process.

A non-perforate deflector plate 21 is secured to one side of the housing below the lowermost drawer 12, and thence extends toward the other side at a downward incline; such deflector plate terminating at its lower end short of such other side of the housing, whereby material may feed downwardly from said lower end of the deflector plate.

Below the deflector plate, and at an opposed incline, is a riffle plate 22 which includes transverse riffles 23; the riffle plate 22 extending, in matching relation, across the housing from side to side thereof.

A discharge opening 24 is formed in the side of the housing immediately above the lower end of said riffle plate 22. At vertically spaced points in the housing 1; to-wit, above the perforate classifier plate 9, between the latter and the distributor plate 11, and between certain adjacent ones of the drawers 12, the device is fitted with horizontal sets of spaced-apart but parallel spray pipes 24. The spray pipes 24 of each set lead from, and are supported by, a manifold 25, and each manifold is in turn supported by, and fed from, a vertical water supply pipe 26 by an attachment nipple 27; the water supply pipe 26 being disposed exteriorly of the housing 1 and including a control valve 28 therein.

The above described metals recovery unit employs the mercury amalgamation process, and the unit functions in the following manner:

Reduced ore material or other gangue with included metal for recovery is fed—after initial rough classification—by gravity into the upper end of the housing 1, and thence feeds along the perforate classifier plate 9, the larger or classified-out material passing through the discharge opening 10 as waste.

The smaller material, carrying the metal to be recovered, feeds through the classifier plate 9 onto the distributor plate 11. From the distributor plate 11 the material flows downwardly, in well distributed relation, through the foraminous drawers 12 and the mercurized copper wool pads 20 therein; the metal—such as gold—to be recovered amalgamating with the mercury on said pads.

After passing through all of the drawers 12 and pads 20 the material is deflected by the plate 21 onto the upper end of the riffle plate 22, and thence gravitates down the latter; a final amalgamation taking place within the confines of the transverse riffles 23.

At the lower end of the riffle plate 22 the gangue discharges from the housing 1 through the discharge opening 24.

Flow of the material through the housing 1 from top to bottom is in water, such flow being maintained and enhanced by the spray which emits from the sets of spray pipes 24.

After the metals recovery unit has been in operation for some time, with the mercurized copper wool pads 20 becoming substantially fully amalgamated, the drawers 12 are withdrawn and fresh ones replaced; this operation being accomplished without necessity of shutting down the operation. To withdraw the drawers 12 it is only necessary to release the securing devices 7 and to open the door 5.

After the drawers 12 are withdrawn from the housing, the copper wool pads are removed from said drawers and then subjected to a smeltering process for the recovery of the gold or other amalgamated metals; the smeltering process also effecting recovery of the copper wool as salable copper and recovery of the mercury for subsequent use.

By employing mercurized copper wool in pads, the desired amalgamation is accomplished in a practical and exceedingly effective manner; the copper wool tending to polish and thus enhance amalgamation as the metal for recovery passes through said pads.

Another feature which assures of effective amalgamation is the fact that the mercurized copper wool pads present in total a very great amalgamating surface.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. In a metals recovery unit, an upstanding rectangular housing having an opening in its front wall extending from side to side thereof, a plurality of drawers separately supported in the housing in vertically spaced relation for individual and selective withdrawal horizontally through said opening, the plurality of drawers being all disposed in a zone intermediate the top and bottom of the opening, each drawer having values retaining material therein, and a door to close the opening.

2. In a metals recovery unit, amalgamating means comprising a drawer, said drawer including a border frame horizontally separated onto an upper portion and a lower portion, said portions being movable from a closed to an open position, a foraminous top on the upper portion, a foraminous bottom on the lower portion, and a mercurized metal wool pad filling the drawer and removably engaged between said foraminous top and bottom.

3. A metals recovery unit comprising a vertically elongated housing, a plurality of drawers supported one above the other in the housing for withdrawal, each drawer being foraminous, a mercurized copper wool pad in each drawer, a perforate classifier plate secured across the housing at an incline above the drawers, there being a discharge opening in the housing at the lower end of the classifier plate, a perforate distributor plate secured across the housing above the drawers and below the classifier plate at an incline opposed to the latter, means to introduce water into the housing and distribute said water above the drawers, a deflector plate below the drawers secured to one side of the housing and extending at a downward incline toward but terminating short of the other side, a riffle plate secured to said other side of the housing below the deflector plate and extending at a downward incline opposed to the latter, and there being a discharge opening adjacent the lower end of the riffle plate.

4. A metals recovery unit comprising a vertically elongated housing, a plurality of drawers supported one above the other in the housing for withdrawal, each drawer being foraminous, a mercurized copper wool pad in each drawer, a perforate classifier plate secured across the housing at an incline above the drawers, there being a discharge opening in the housing at the lower end of the classifier plate, a perforate distributor plate secured across the housing above the drawers and below the classifier plate at an incline opposed to the latter, means to introduce water into the housing and distribute said water above the drawers, a deflector plate below the drawers secured to one side of the housing and extending at a downward inclined toward but terminating short of the other side, a riffle plate secured to said other side of the housing below the deflector plate and extending at a downward incline opposed to the latter, and there being a discharge opening adjacent the lower end of the riffle plate; said water introduction means including a plurality of sets of horizontal spray pipes in the housing, one set being above the classifier plate, another set between the classifier plate and distributor plate, and a third set between certain adjacent ones of said drawers.

LEE R. COX.

REFERENCES CITED

The following references are of record in the file of this patent:

UNITED STATES PATENTS

| Number | Name | Date |
|---|---|---|
| 126,196 | Fraser | Apr. 30, 1872 |
| 152,227 | Heatherington | June 23, 1874 |
| 669,671 | Tobin | Mar. 12, 1901 |
| 780,109 | Langridge | Jan. 17, 1905 |
| 994,476 | McGuire | June 6, 1911 |
| 1,187,927 | Ramsey | June 20, 1916 |
| 1,395,833 | Kling et al. | Nov. 1, 1921 |
| 2,453,206 | Donat | Nov. 9, 1948 |

FOREIGN PATENTS

| Number | Country | Date |
|---|---|---|
| 9,531 | France | Nov. 23, 1908 |